US009150000B2

(12) United States Patent
Jiang et al.

(10) Patent No.: US 9,150,000 B2
(45) Date of Patent: Oct. 6, 2015

(54) METHOD FOR MAKING TRANSPARENT CONDUCTIVE ELEMENT

(71) Applicants:Tsinghua University, Beijing (CN); HON HAI PRECISION INDUSTRY CO., LTD., New Taipei (TW)

(72) Inventors: Kai-Li Jiang, Beijing (CN); Qun-Qing Li, Beijing (CN); Yang Wei, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 97 days.

(21) Appl. No.: 13/902,289

(22) Filed: May 24, 2013

(65) Prior Publication Data

US 2014/0144576 A1    May 29, 2014

(30) Foreign Application Priority Data

Nov. 28, 2012  (CN) .......................... 2012 1 0493750

(51) Int. Cl.
*B32B 5/12* (2006.01)
*B32B 5/08* (2006.01)
(Continued)

(52) U.S. Cl.
CPC ... *B32B 5/12* (2013.01); *B32B 5/08* (2013.01); *B32B 27/04* (2013.01); *B32B 27/12* (2013.01); *B32B 37/04* (2013.01); *B32B 37/182* (2013.01); *B32B 37/185* (2013.01); *B32B 2038/0028* (2013.01); *B32B 2038/0072* (2013.01); *B32B 2260/021* (2013.01); *B32B 2260/046* (2013.01); *Y10T 156/10* (2015.01); *Y10T 156/1002* (2015.01); *Y10T 156/1028* (2015.01); *Y10T 156/1043* (2015.01); *Y10T 156/1062* (2015.01)

(58) Field of Classification Search
CPC .......... B32B 5/12; B32B 27/12; B32B 27/04; B32B 37/185; B32B 2038/0028; B32B 2038/0072; B32B 2260/021; B32B 2260/046; B82Y 30/00; B82Y 40/00; B82Y 15/00; B82Y 10/00; Y10T 156/10; Y10T 156/1002; Y10T 156/1028; Y10T 156/1043; Y10T 156/1062
USPC .......... 428/364, 367, 375; 156/495, 229, 447; 118/729, 718; 264/291, 172.19, 335, 264/238, 292, 82; 423/461; 427/255.28, 427/350, 220
See application file for complete search history.

(56) References Cited

U.S. PATENT DOCUMENTS

2006/0060825 A1    3/2006  Glatkowski
2008/0018012 A1*   1/2008  Lemaire et al. ................. 264/82
(Continued)

FOREIGN PATENT DOCUMENTS

JP    5-250920      9/1993
JP    2007-314417   12/2007
(Continued)

*Primary Examiner* — Alex Efta
(74) *Attorney, Agent, or Firm* — Novak Druce Connolly Bove + Quigg LLP

(57) ABSTRACT

A method for making a transparent conductive element includes providing a carbon nanotube film. The carbon nanotube film includes a number of carbon nanotube wires in parallel with and spaced from each other and a number of carbon nanotubes in contact with adjacent two of the carbon nanotube wires. The carbon nanotube film is placed on a surface of a softened polymer substrate. The polymer substrate and the carbon nanotube film are stretched. The softened polymer substrate is solidified to maintain the stretched state of the carbon nanotube film.

2 Claims, 4 Drawing Sheets

(51) Int. Cl.
  *B32B 27/12* (2006.01)
  *B32B 27/04* (2006.01)
  *B32B 37/04* (2006.01)
  *B32B 37/18* (2006.01)
  *B32B 38/00* (2006.01)

(56) References Cited

U.S. PATENT DOCUMENTS

| | | | |
|---|---|---|---|
| 2008/0170982 A1* | 7/2008 | Zhang et al. | 423/447.3 |
| 2008/0280137 A1* | 11/2008 | Ajayan et al. | 428/375 |
| 2009/0056589 A1* | 3/2009 | Guiheen et al. | 106/285 |
| 2010/0124645 A1 | 5/2010 | Jiang et al. | |
| 2010/0124646 A1* | 5/2010 | Jiang et al. | 428/220 |
| 2010/0215945 A1 | 8/2010 | Ota et al. | |

FOREIGN PATENT DOCUMENTS

| | | |
|---|---|---|
| JP | 2009-199842 | 9/2009 |
| JP | 2010-116317 | 5/2010 |
| TW | 200927451 | 7/2009 |
| WO | WO2009041170 | 4/2009 |

\* cited by examiner

METHOD FOR MAKING TRANSPARENT CONDUCTIVE ELEMENT

BACKGROUND

1. Technical Field

The present disclosure relates methods for making transparent conductive elements, especially, a method for making a transparent conductive element based on carbon nanotubes.

2. Description of Related Art

Carbon nanotube (CNT) is a new material and prepared by Japanese researcher Iijima (Helical Microtubules of Graphitic Carbon, Nature, V354, P56~58 (1991)). Carbon nanotube film attracts more attention because of excellent electric conductivity and light transmittance.

A method for making a carbon nanotube film is disclosed by Baughman in a paper ("Strong, Transparent, Multifunctional, Carbon Nanotube Sheets" Mei Zhang, Shaoli Fang, Anvar A. Zakhidov, Ray H. Baughman, etc. Science, Vol. 309, P1215-1219 (2005)). The carbon nanotube film is pulled out from a carbon nanotube array grown on a substrate. However, the light transmittance of the carbon nanotube film is relatively low and cannot meet the requirement of the electric device.

In U.S. Pat. No. 7,973,295, Jiang provides a method for making a transparent carbon nanotube film. The method includes the following steps: drawing a carbon nanotube film from a carbon nanotube array, the carbon nanotube film includes a plurality of carbon nanotubes in parallel with a surface of the carbon nanotube film; and irradiating the carbon nanotube film by a laser so that some of the plurality of carbon nanotubes are oxide and the carbon nanotube film becomes thinner. The carbon nanotube film can be used in transparent electrode, thin-film transistor, and touch panel. In use, the carbon nanotube film is located on a glass or a resin sheet. However, it is low efficient and high cost relatively by laser irradiating the carbon nanotube film.

What is needed, therefore, is to provide a method for making a transparent conductive element with high efficient and low cost.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present methods for making transparent conductive elements.

Figure 1:
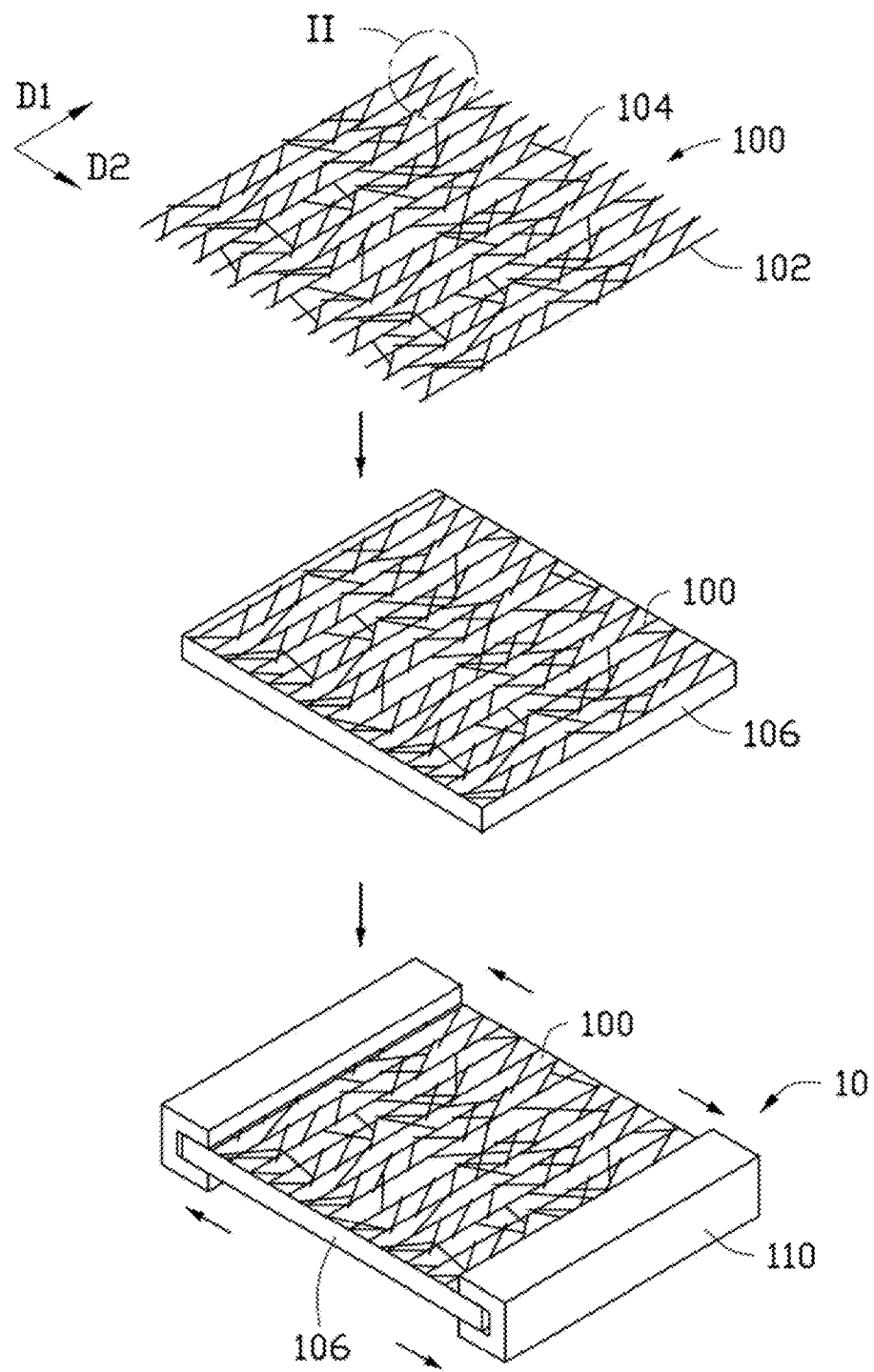
FIG. 1 is a flow chart of one embodiment of a method for making a transparent conductive element using a carbon nanotube film.

Referring to FIG. 1, a method of one embodiment for making transparent conductive element 10 comprises following steps:

step (S1), providing a carbon nanotube film 100; and step (S2), placing the carbon nanotube film 100 on a surface of a thermal plastic polymer substrate 106;

step (S3), softening the thermal plastic polymer substrate 106 by heating;

step (S4), stretching the thermal plastic polymer substrate 106 with the carbon nanotube film 100 thereon; and step (S5), solidifying thermal plastic polymer substrate 106 to maintain the stretched state of the carbon nanotube film 100.

In step (S1), the carbon nanotube film 100 can be made by following substeps:

step (S10), providing a carbon nanotube array on a substrate; and step (S12), drawing out the carbon nanotube film 100 from the carbon nanotube array by using a tool.

In step (S10), the carbon nanotube array includes a plurality of carbon nanotubes that are parallel to each other and substantially perpendicular to the substrate. The height of the plurality of carbon nanotubes can be in a range from about 50 micrometers to 900 micrometers. The carbon nanotube array can be formed by the substeps of: step (S101) providing a substantially flat and smooth substrate; step (S102) forming a catalyst layer on the substrate; step (S103) annealing the substrate with the catalyst layer in air at a temperature approximately ranging from 700° C. to 900° C. for about 30 minutes to 90 minutes; step (S104) heating the substrate with the catalyst layer to a temperature approximately ranging from 500° C. to 740° C. in a furnace with a protective gas therein; and step (S105) supplying a carbon source gas to the furnace for about 5 minutes to 30 minutes and growing the carbon nanotube array on the substrate.

In step (S101), the substrate can be a P-type silicon wafer, an N-type silicon wafer, or a silicon wafer with a film of silicon dioxide thereon. A 4-inch P-type silicon wafer is used as the substrate. In step (S102), the catalyst can be made of iron (Fe), cobalt (Co), nickel (Ni), or any alloy thereof. In step (S103), the protective gas can be made up of at least one of nitrogen ($N_2$), ammonia ($NH_3$), or a noble gas. In step (S105), the carbon source gas can be a hydrocarbon gas, such as ethylene ($C_2H_4$), methane ($CH_4$), acetylene ($C_2H_2$), ethane ($C_2H_6$), or any combination thereof. The carbon nanotube array formed under the above conditions is essentially free of impurities, such as carbonaceous or residual catalyst particles.

In step (S12), the drawing out the carbon nanotube film 100 includes the substeps of: step (S121) selecting one or more of carbon nanotubes in a predetermined width from the carbon nanotube array; and step (S122) drawing the selected carbon nanotubes to form nanotube segments at an even and uniform speed to achieve the carbon nanotube film 100.

In step (S121), the carbon nanotubes having a predetermined width can be selected by using an adhesive tape, such as the tool, to contact the super-aligned array. In step (S122), the drawing direction is substantially perpendicular to the growing direction of the carbon nanotube array. Each carbon nanotube segment includes a plurality of carbon nanotubes parallel to each other.

More specifically, during the drawing process, as the initial carbon nanotube segments are drawn out, other carbon nanotube segments are also drawn out end-to-end due to van der Waals attractive force between ends of adjacent segments. This process of drawing helps provide a continuous and uniform carbon nanotube film 100 having a predetermined width can be formed.

The width of the carbon nanotube film 100 depends on a size of the carbon nanotube array. The length of the carbon nanotube film 100 can be arbitrarily set as desired. In one useful embodiment, when the substrate is a 4-inch P-type silicon wafer, the width of the carbon nanotube film 100 can be in a range from about 0.01 centimeters to about 10 centimeters. The thickness of the carbon nanotube film 100 can be in a range from about 0.5 nanometers to about 1000 micrometers, such as 100 micrometers. The carbon nanotubes of the carbon nanotube film 100 can be single-walled, double-walled, or multi-walled carbon nanotubes. The diameter of the single-walled carbon nanotubes can be in a range from about 0.5 nanometers to about 50 nanometers. The diameter of the double-walled carbon nanotubes can be in a range from about 1.0 nanometers to about 50 nanometers. The diameter of the multi-walled carbon nanotubes can be in a range from about 1.5 nanometers to about 50 nanometers. The length of the carbon nanotubes of the carbon nanotube film 100 can be in a range from about 50 micrometers to about 5 millimeters.

Figure 2:
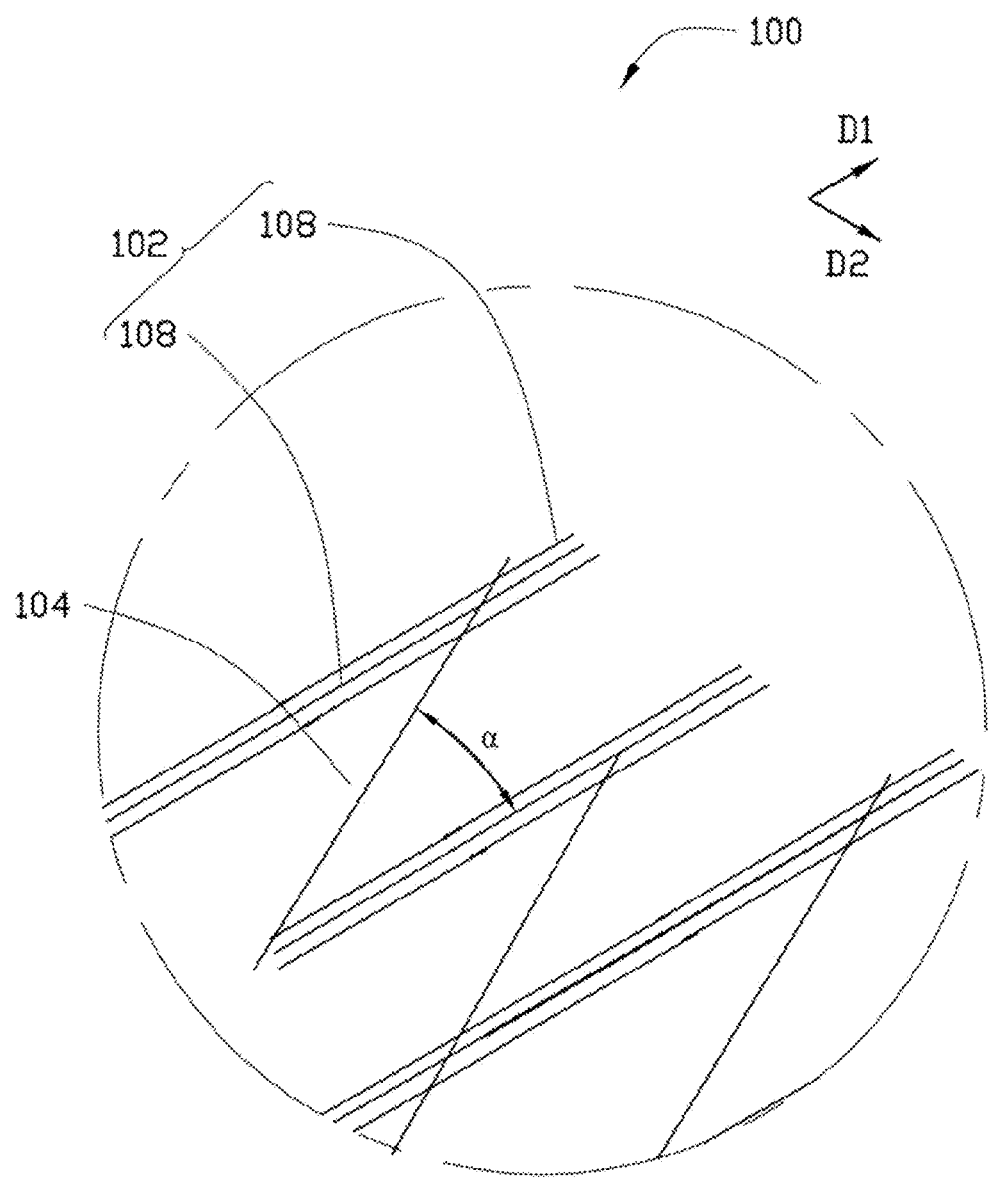
FIG. 2 is an enlarged schematic view of part II of the carbon nanotube film of FIG. 1.
Figure 3:
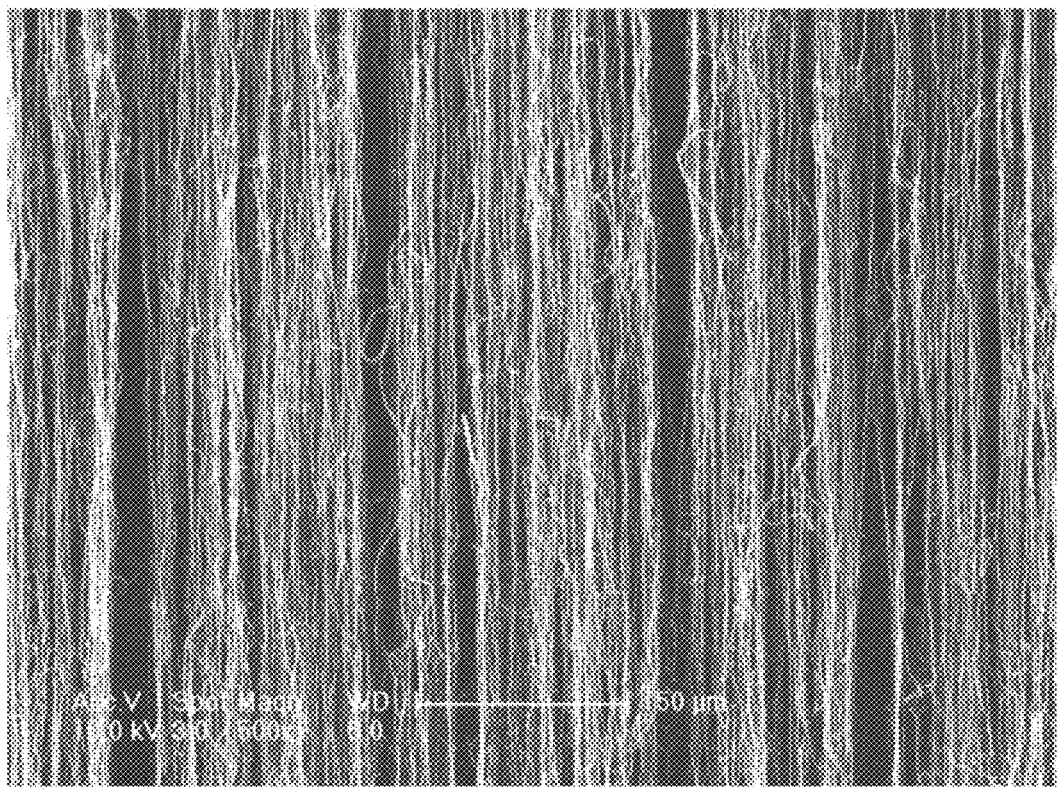
FIG. 3 is a scanning electron microscope (SEM) image of one embodiment of a carbon nanotube film.

Further referring to FIGS. 2 and 3, one embodiment of the carbon nanotube film 100 includes a plurality of carbon nanotube wires 102 located side by side and in parallel with each other, and a plurality of carbon nanotubes 104 dispersed on and in contact with the plurality of carbon nanotube wires 102. The extending direction of the plurality of carbon nanotube wires 102 is the same as the drawing direction of the carbon nanotube film 100. Each carbon nanotube wire 102 includes a plurality of carbon nanotubes 108 joined end to end and extending along the same direction. The carbon nanotubes 108 of each carbon nanotube wire 102 are substantially aligned along an axis of the carbon nanotube wire 102, and attracted by van der Waals attractive force therebetween. That is, a majority of carbon nanotubes 108 of the carbon nanotube film 100 are arranged to substantially extend along the same direction to form the plurality of carbon nanotube wires 102, and a minority of dispersed carbon nanotubes 104 of the carbon nanotube film 100 may be located and arranged randomly. The majority of carbon nanotubes 108 are defined as a first set of carbon nanotubes, and the minority of dispersed carbon nanotubes 104 are defined as a second set of carbon nanotubes. Each adjacent two of the carbon nanotube wires 102 may be connected by several carbon nanotubes 104. Each of the carbon nanotubes 104 may connect several parallel carbon nanotube wires 102. Adjacent two of the carbon nanotube wires 102 are attracted by van der Waals attractive force therebetween. Adjacent two of the plurality of carbon nanotube wires 102 can be spaced from or in contact with each other. In one embodiment, a distance between the adjacent carbon nanotube wires 102 can be in a range from about 0 micrometers to about 50 micrometers. The plurality of carbon nanotube wires 102 are uniformly distributed in the carbon nanotube film 100 and substantially extend along a first direction D1. An angle α can be formed between the extending direction of the carbon nanotubes 104 and the first direction D1. The angle α is greater than 0 degrees and less than 90 degrees. The plurality of carbon nanotube wires 102 and the plurality of carbon nanotubes 104 are connected with each other so that the carbon nanotube film 100 to form a grid like conductive net.

The carbon nanotube film 100 is a free-standing structure. The term "free-standing structure" means that the carbon nanotube film 100 can sustain the weight of itself when it is hoisted by a portion thereof without any significant damage to its structural integrity. Thus, the carbon nanotube film 100 can be suspended by two spaced supports. The carbon nanotube film 100 is stretchable and elastic along a second direction D2. The second direction D2 is substantially perpendicular to the first direction D1. If the carbon nanotube film 100 is stretched along the second direction D2, the carbon nanotube film 100 will form an elastic deformation along the second direction D2. Thus, the distance between adjacent carbon nanotube wires 102 is changed. Specifically, the distance between adjacent carbon nanotube wires 102 is increased with the increase of the elastic deformation of the carbon nanotube film 100 along the second direction D2. At the same time, the angle α is increased as the increase of the distance between adjacent carbon nanotube wires 102. The angle α can be equal to 90 degrees during being stretched. The deformation rate of the carbon nanotube film 100 along the second direction D2 should be less than or equal to 300%. The deformation rate means the width/length ratio of the carbon nanotube film 100 after deformation and before deformation. If the deformation rate of the carbon nanotube film 100 along the second direction D2 is too large, the stretched carbon nanotube film 100 cannot maintain the structure integrity. That is, the stretched carbon nanotube film 100 only forms a plurality of independent conductive paths that cannot form the conductive net.

The deformation rate of the carbon nanotube film 100 along the second direction D2 is related to the thickness and the density of the carbon nanotube film 100. The greater the thickness and the density of the carbon nanotube film 100 are, the larger the deformation rate of the carbon nanotube film 100 along the second direction D2 can be. Furthermore, the deformation rate of the carbon nanotube film 100 can also be related to the number of the carbon nanotubes 104 between the adjacent carbon nanotube wires 102. The greater the number of the carbon nanotubes 104 between the carbon nanotube wires 102 is, the greater the deformation rate of the carbon nanotube film 100 along the second direction D2 can be. In one embodiment, the deformation rate of the carbon nanotube film 100 along the second direction D2 is about 150%.

A light transmittance (transmitting ratio of visible light) of the carbon nanotube film 100 is related to the thickness and the density of the carbon nanotube film 100. The larger the thickness and density of the carbon nanotube film 100 are, the lower the light transmittance of the carbon nanotube film is. Furthermore, the light transmittance of the carbon nanotube film 100 can be related to the number of the carbon nanotubes 104 between the carbon nanotube wires 102 and the distance between the adjacent carbon nanotube wires 102. The larger the distance between the carbon nanotube wires 102 and the fewer the number of the carbon nanotubes 104 between the carbon nanotube wires 102, the higher the light transmittance of the carbon nanotube film 100 is. The light transmittance of the carbon nanotube film 100 can be in a range from about 60% to about 95%. In one embodiment, before being stretched, the thickness of the carbon nanotube film 100 is about 50 nanometers, and the light transmittance of the carbon nanotube film 100 is in a range from about 67% to about 82%. After being stretched with the deformation rate of about 120%, the light transmittance of the carbon nanotube film 100 is in a range from about 84% to about 92%. Using green light with a wavelength of 550 nanometers as an example, the green light transmittance of the carbon nanotube film 100 before being stretched is about 78%, and after being stretched with the deformation rate of about 120%, the green light transmittance of the carbon nanotube film 100 increases to about 89%.

In step (S2), the carbon nanotube film 100 is directly laid on the surface of the thermal plastic polymer substrate 106.

In one embodiment, two or more than two carbon nanotube films 100 can be stacked on the same surface of the thermal plastic polymer substrate 106 with the carbon nanotube wires 102 substantially extending along the same direction. In one embodiment, two or more than two carbon nanotube films 100 can be laid on two opposite surfaces of the thermal plastic polymer substrate 106 with the carbon nanotube wires 102 substantially extending along the same direction. In one embodiment, the carbon nanotube film 100 can be sandwiched between two stacked thermal plastic polymer substrates 106.

The thermal plastic polymer substrate 106 is a thermoplastic polymer sheet. The shape and size of the thermal plastic polymer substrate 106 can be selected according to need. The thickness of the thermal plastic polymer substrate 106 can be in a range from about 1 micrometer to about 2 millimeters. In one embodiment, the thickness of the thermal plastic polymer substrate 106 can be in a range from about 100 micrometers to about 1 millimeter. The thermal plastic polymer substrate 106 includes material such as polyethylene (PE), polyvinyl chloride (PVC), polytetrafluoroethylene (PTFE), polypropylene (PP), polystyrene (PS), polymethyl methacrylate (PMMA), polycarbonate (PC), polyethylene terephthalate succinic ester (PBT), polyamide (PA), polyether ketone (PEK), polysulfone (PS), poly(ether sulfone) (PES), cellulose acetate, thermoplastic polyimide (PI), polyethylene terephthalate (PET), benzene and cyclobutene (BCB), poly (ether imide) (PEI), polyphenylene oxide (PPO), polyphenylene sulfide (PPS), or poly(vinyl acetate) (PVAC). In one embodiment, the thermal plastic polymer substrate 106 is a rectangle PET sheet with a thickness of about 100 micrometers.

In step (S3), the device for softening the thermal plastic polymer substrate 106 can be a metal double roller, a tablet compression molding machine, an extrusion machine, a flat vulcanizing machine, or an oven. The purpose of the step (S3) is to make the thermal plastic polymer substrate 106 have high elasticity.

In one embodiment, the softening the thermal plastic polymer substrate 106 is performed by metal double roller. The metal double roller includes two metal rollers closely located with each other and a heater for heating the metal rollers. The two metal rollers are rotatable along opposite direction. The thermal plastic polymer substrate 106 with the carbon nanotube film 100 thereon passes through the two metal rollers slowly with the speed in a range from about 1 millimeter/minute to about 10 meters/minute. At the same time, the metal rollers are heated to a softening temperature of the thermal plastic polymer substrate 106 so that the thermal plastic polymer substrate 106 can be softened and combined with the carbon nanotube film 100 firmly during passing through metal rollers. The air between the thermal plastic polymer substrate 106 and the carbon nanotube film 100 will also be removed during passing through metal rollers. The softening temperature of the thermal plastic polymer substrate 106 is related to the material of the thermal plastic polymer substrate 106. Furthermore, part of the carbon nanotube film 100 will be embedded in the thermal plastic polymer substrate 106 because of the pressure of the two metal rollers. In one embodiment, the thermal plastic polymer substrate 106 is a PET sheet with a softening temperature in a range from about 150° C. to about 200° C. Furthermore, the softening the thermal plastic polymer substrate 106 can be performed in a vacuum so that the air between the thermal plastic polymer substrate 106 and the carbon nanotube film 100 can be easily removed.

In step (S4), the thermal plastic polymer substrate 106 with the carbon nanotube film 100 thereon can be stretched along any direction different from the direction D1. In one embodiment, the thermal plastic polymer substrate 106 with the carbon nanotube film 100 thereon is stretched along the direction D2.

In one embodiment, two fixing devices 110 are used to clamp two opposite sides of the thermal plastic polymer substrate 106 that are parallel with the direction D1. Two opposite pulling forces are applied to the two fixing devices 110 along the direction D2 to stretch the thermal plastic polymer substrate 106 with the carbon nanotube film 100 thereon. The two fixing devices 110 allow the thermal plastic polymer substrate 106 with the carbon nanotube film 100 thereon being stretched uniformly.

The pulling forces and the stretching speed can be selected according to need. If the stretching speed is too fast, the thermal plastic polymer substrate 106 and the carbon nanotube film 100 will be easily broken. The stretching speed can be less than or equal to 20 centimeters/second. In one embodiment, the stretching speed is about 5 centimeters/second. After being stretched, the carbon nanotube film 100 is still maintained as structure integrity. The plurality of carbon nanotube wires 102 and the plurality of carbon nanotubes 104 are connected with each other so that the carbon nanotube film 100 form a conductive net.

Because the carbon nanotube film 100 is fixed on the thermal plastic polymer substrate 106, the carbon nanotube film 100 will be stretched as the thermal plastic polymer substrate 106 is stretched. When the carbon nanotube film 100 is stretched by along the direction D2, the distance between the carbon nanotube wires 102 is increased, and the angle α is also increased. Before being stretched, the distance between the carbon nanotube wires 102 is in a range from about 0 micrometers to about 10 micrometers, and after being stretched, the maximal distance between the carbon nanotube wires 102 can reach to about 50 micrometers. In one embodiment, the carbon nanotube film 100 is a single layer of carbon nanotube film, and the deformation rate of the carbon nanotube film 100 along the second direction D2 is about 150%.

In step (S5), the solidifying thermal plastic polymer substrate 106 can be performed by cooling. In one embodiment, the thermal plastic polymer substrate 106 is solidified by natural cooling to room temperature so that the stretched state of the carbon nanotube film 100 can be maintained.

Figure 4:
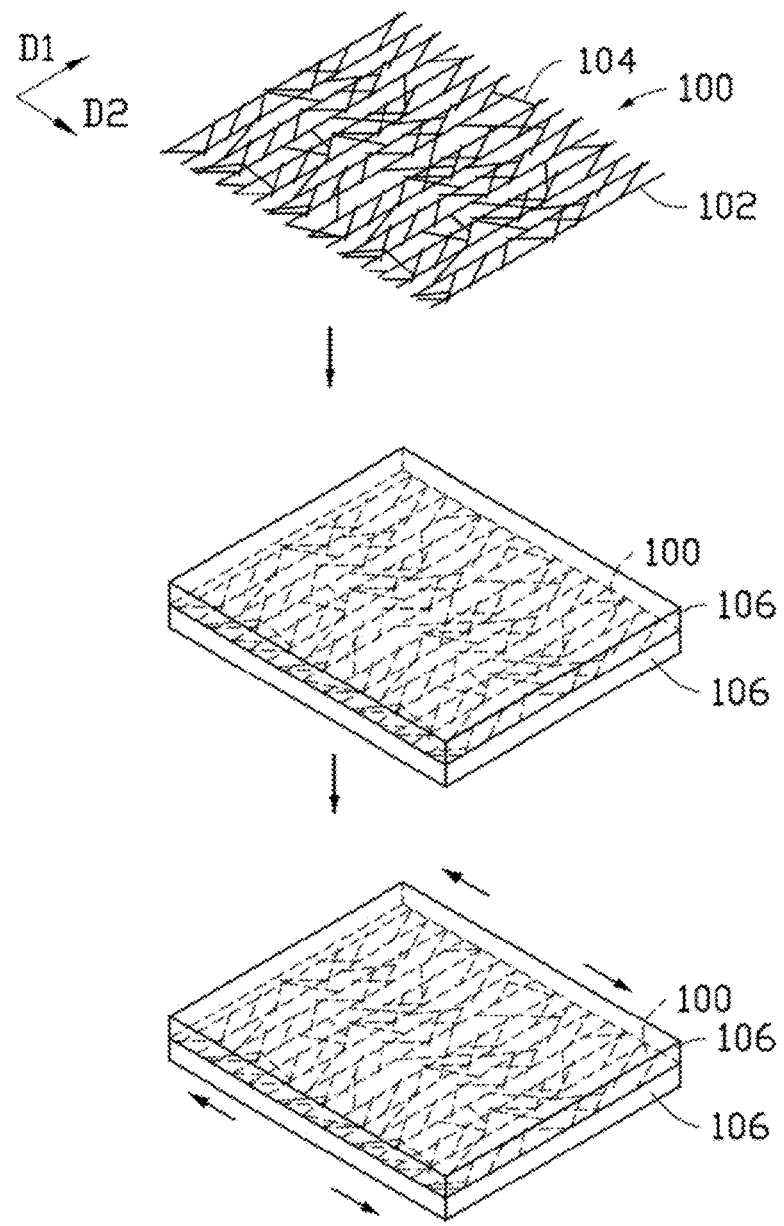
FIG. 4 is a flow chart of another embodiment of a method for making a transparent conductive element.

Referring to FIG. 4, a method of one embodiment for making transparent conductive element 10 comprises following steps:

step (S1A), providing a carbon nanotube film 100; and step (S2A), placing the carbon nanotube film 100 on a surface of a softened thermosetting polymer substrate 106;

step (S3A), stretching the thermosetting polymer substrate 106 with the carbon nanotube film 100 thereon; and step (S4A), solidifying thermosetting polymer substrate 106 to maintain the stretched state of the carbon nanotube film 100.

The method of FIG. 4 is similar to the method of FIG. 1 except that the substrate 106 is made of thermosetting polymer and the carbon nanotube film 100 is sandwiched between two thermosetting polymer substrates 106.

The thermosetting polymer substrate 106 can be made of material such as phenolic resin, epoxy resin, bismaleimide (BMI) resin, polystyrene resin, cyanate ester resin, polyimide resin, or unsaturated poly acid resin In step (S4A), the solidifying thermosetting polymer substrate 106 is performed by heating. The heating temperature for solidifying thermosetting polymer substrate 106 can be selected according to need.

The method for making a transparent conductive element 10 has high efficient and low cost. In addition, the light transmittance of the carbon nanotube film 100 can be improved by stretching.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a transparent conductive element, the method comprising:
   making a carbon nanotube film comprising a plurality of carbon nanotubes, wherein the plurality of carbon nanotubes comprises a first set and a second set; and the first set are arranged to substantially extend along a first direction to form a plurality of carbon nanotube wires in parallel with each other, and the second set is on a surface of the carbon nanotube film and in contact with the plurality of carbon nanotube wires;
   placing the carbon nanotube film between two softened polymer sheets;
   stretching the softened polymer sheets with the carbon nanotube film thereon along a second direction that is perpendicular to the first direction, so that the carbon nanotube film forms a stretched state along the second direction; and
   solidifying the softened polymer substrate to maintain the stretched state of the carbon nanotube film.

2. A method for making a transparent conductive element, the method comprising:
   making a carbon nanotube film, wherein the carbon nanotube film comprises a plurality of carbon nanotube wires located side by side and in parallel with each other, and a plurality of carbon nanotubes dispersed on and in contact with the plurality of carbon nanotube wires;
   placing the carbon nanotube film on a surface of a thermoplastic polymer substrate;
   forming a softened thermoplastic polymer substrate by heating the thermoplastic polymer substrates, wherein the heating the thermoplastic polymer substrates comprises pressing the thermoplastic polymer substrates and the carbon nanotube film so that part of the carbon nanotube film is embedded in the thermoplastic polymer substrates;
   stretching the softened thermoplastic polymer substrate with the carbon nanotube film thereon along a direction that is perpendicular to a length direction of the plurality of carbon nanotube wires so that the carbon nanotube film form a stretched state; and
   solidifying the softened thermoplastic polymer substrate to maintain the stretched state of the carbon nanotube film.

* * * * *